United States Patent [19]
Preston et al.

[11] Patent Number: 5,656,090
[45] Date of Patent: Aug. 12, 1997

[54] VALVE DEVICE AND RESIN COATING APPARATUS INCORPORATING SAME

[75] Inventors: Roger Stephen Preston, Royston; Kenneth Charles Paxton, Hertford, both of England

[73] Assignee: Pirelli General plc, London, England

[21] Appl. No.: 410,236

[22] Filed: Mar. 24, 1995

[30] Foreign Application Priority Data

Mar. 31, 1994 [GB] United Kingdom ............... 9406475

[51] Int. Cl.$^6$ ....................................... B05C 3/00
[52] U.S. Cl. ............... 118/684; 118/405; 118/407; 118/419; 118/420; 137/625.11
[58] Field of Search ................... 118/684, 405, 118/407, 419, 420; 137/625.11

[56] References Cited

U.S. PATENT DOCUMENTS

| | | | |
|---|---|---|---|
| 3,240,225 | 3/1966 | Barrows | 137/240 |
| 3,837,360 | 9/1974 | Bubula | 137/625.11 |
| 3,924,810 | 12/1975 | Otterstetter. | |
| 3,972,350 | 8/1976 | Pickett | 137/625.11 |
| 4,592,305 | 6/1986 | Scharfenberger | 118/302 |
| 4,993,353 | 2/1991 | Ogasawara et al. | 118/302 |

FOREIGN PATENT DOCUMENTS

| | | |
|---|---|---|
| 4214779 | 11/1993 | Germany. |
| 1232893 | 5/1971 | United Kingdom. |
| 2050875 | 1/1981 | United Kingdom. |

OTHER PUBLICATIONS

Japanese Abstracts of Japan—vol. 13, No. 312 (E–788) 17 Jul. 1989.

Primary Examiner—Laura Edwards
Attorney, Agent, or Firm—Brooks Haidt Haffner & Delahunty

[57] ABSTRACT

An apparatus for coating an optical fibre with a selected one of a plurality of different resins includes respective reservoirs for the resins, an applicator for applying a resin coating to the optical fibre and a distributor between the reservoirs and the applicator including a valve device which is operable for putting any selected one of the reservoirs in flow communication with the applicator. The valve device includes a first body defining a plurality of inlet passages each of which is interconnected to a respective reservoir by a respective inlet conduit and a second body defining an outlet passage which is interconnected to the applicator via an outlet conduit. A flow control device is disposed between the bodies and the bodies are relatively moveable for putting any selected one of the inlet passages in alignment with the outlet passage. The flow control device has a first position relative to the second body for blocking all of the inlet passages and the outlet passage and a second position relative to the second body for allowing flow to the outlet passage from an inlet passage aligned therewith.

16 Claims, 4 Drawing Sheets

VALVE DEVICE AND RESIN COATING APPARATUS INCORPORATING SAME

BACKGROUND OF THE INVENTION

This invention relates to a valve device and more particularly, but not exclusively, to an apparatus for coating an elongate member with a selected one of a plurality of different resins, which apparatus incorporates a valve device.

Optical fibres are coated with resin immediately after drawing from a preform to protect them from damage. Typically, such fibres are provided with two coatings, the first being a low modulus coating to buffer the fibre from lateral pressure and the second being a harder and more robust coating to protect the first coating, and hence the fibre, from mechanical damage. The coating is also advantageously used for identification purposes by being coloured. Colouring of the coating is conventionally achieved by 'inking' it in a separate operation after its application, but this is disadvantageous as it adds an additional step to the manufacturing process.

The use of a coloured resin for the visible coating (i.e. the second coating in the two coating arrangement discussed above) would eliminate the need for the 'inking' step but presents its own problems. In particular, unless it were possible to dedicate separate fibre drawing lines to each colour, there is a need to clean the resin applicator each time it was required to change the colour of the visible coating. This requires not only labour but also causes a loss in production due to down-time and furthermore disruption of the applicator set-up. One solution to these problems is to provide the drawing line with a plurality of resin applicators each for applying a different coloured resin. However, this solution has the disadvantage of requiring a longer drawing line in order to accommodate the extra applicators and also the setting up of the extra applicators.

SUMMARY OF THE INVENTION

An object of the present invention is to provide a valve device which enables different resins (e.g. different coloured resins) to be selectively supplied to an applicator for applying the resin to an elongate member (e.g. an optical fibre being drawn from a preform).

The invention provides a valve device comprising a first body defining a plurality of inlet passages each of which is connectable to a respective inlet conduit; a second body defining an outlet passage connectable to an outlet conduit; and a flow control means disposed between said first and second bodies, said bodies being relatively moveable for putting any selected one of said inlet passages in alignment with said outlet passage, and said flow control means having a first position relative to said second body for blocking all of said inlet passages and said outlet passage and a second position relative to said second body for allowing flow to said outlet passage from an inlet passage aligned therewith.

The invention also includes apparatus for coating an elongate member with a selected one of a plurality of different resins comprising a plurality of reservoirs for containing supplies of respective resins, an applicator for applying a resin coating to an elongate member and a distribution means between said reservoirs and said applicator comprising a valve device as defined in the last preceding paragraph, respective inlet conduits interconnecting said reservoirs with respective inlet passages of said valve device and an outlet conduit, via which said valve device is connected to said applicator.

The above-mentioned valve bodies of the valve device are preferably relatively rotatable about an axis for putting any selected one of said inlet passages in alignment with said outlet passage, said inlet passages having ports adjacent said control means which are circumferentially spaced apart about said axis, said outlet passage having a port adjacent said control means with which port said inlet passage ports are alignable on relative rotation of said bodies.

The control means may comprise a planar seal element disposed between respective faces of said bodies in which said ports are disposed for sealing engagement with said faces, said seal element having a through-aperture which is aligned with said outlet passage port in said second position of said flow control means and which is radially spaced from said outlet passage port in said first position of said flow control means.

Selectively operable means may be provided for urging said body faces into engagement with said seal element.

In a preferred embodiment, the second body is rotatable about said axis, and in this case advantageously said outlet passage extends within said second body from said port thereof adjacent said control means to a further port on said axis.

In the above-mentioned preferred embodiment, the second body is supported for rotation about said axis adjacent said further port by a third body having a through passage aligned with said further port.

Also in the preferred embodiment, the selectively operable means for urging said faces into engagement with said seal element comprises means for causing said third body to apply an axial force to said second body in a direction towards said first body.

BRIEF DESCRIPTION OF THE DRAWINGS

In order that the preferred embodiment may be well understood, the above-mentioned preferred embodiment, which is given by way of example only, will now be described in more detail with reference to the accompanying drawings, in which.

DETAILED DESCRIPTION OF THE INVENTION

Figure 1:
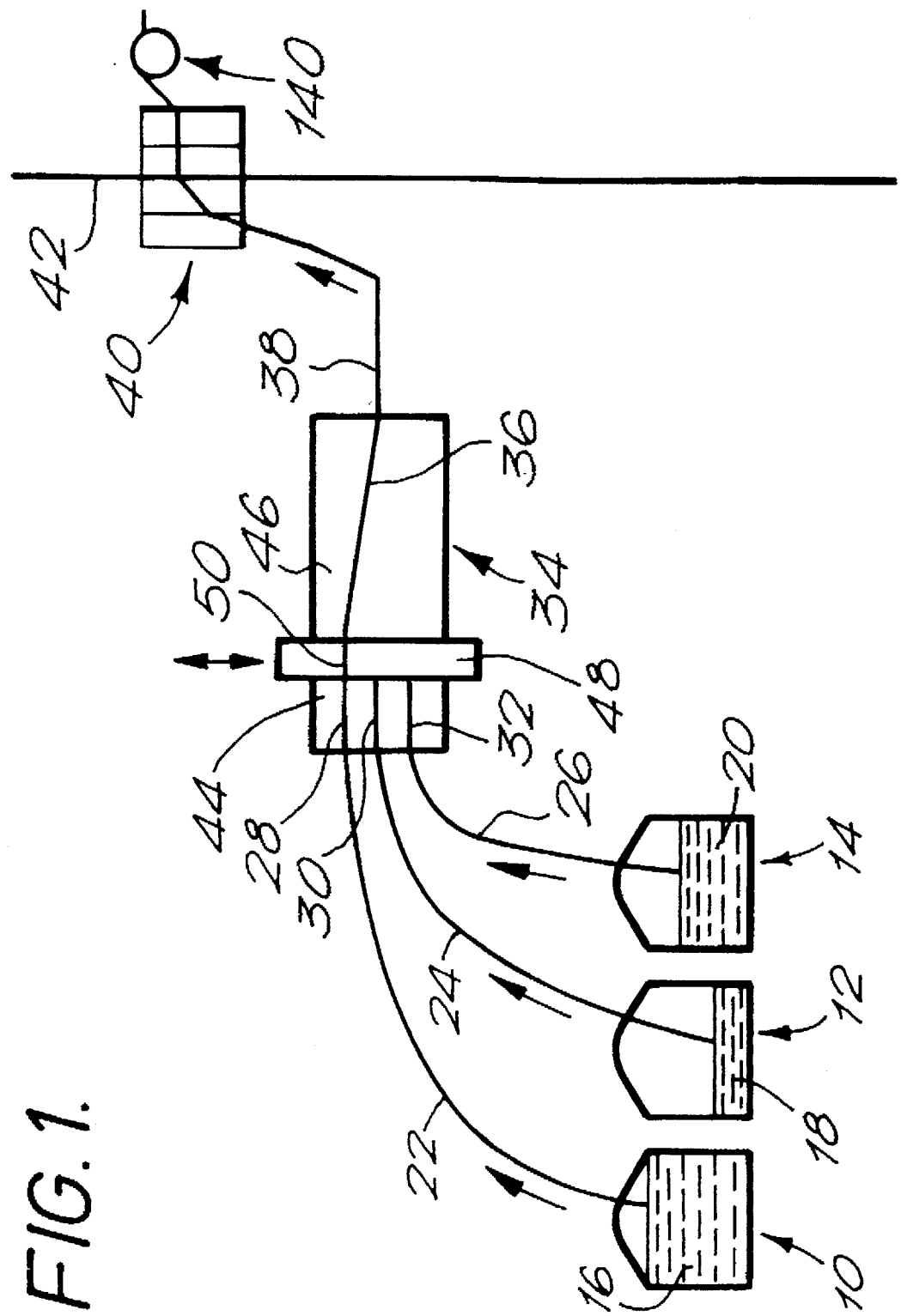
FIG. 1 schematically shows an apparatus for coating an elongate member with a selected one of a plurality of resins.
Figure 2:
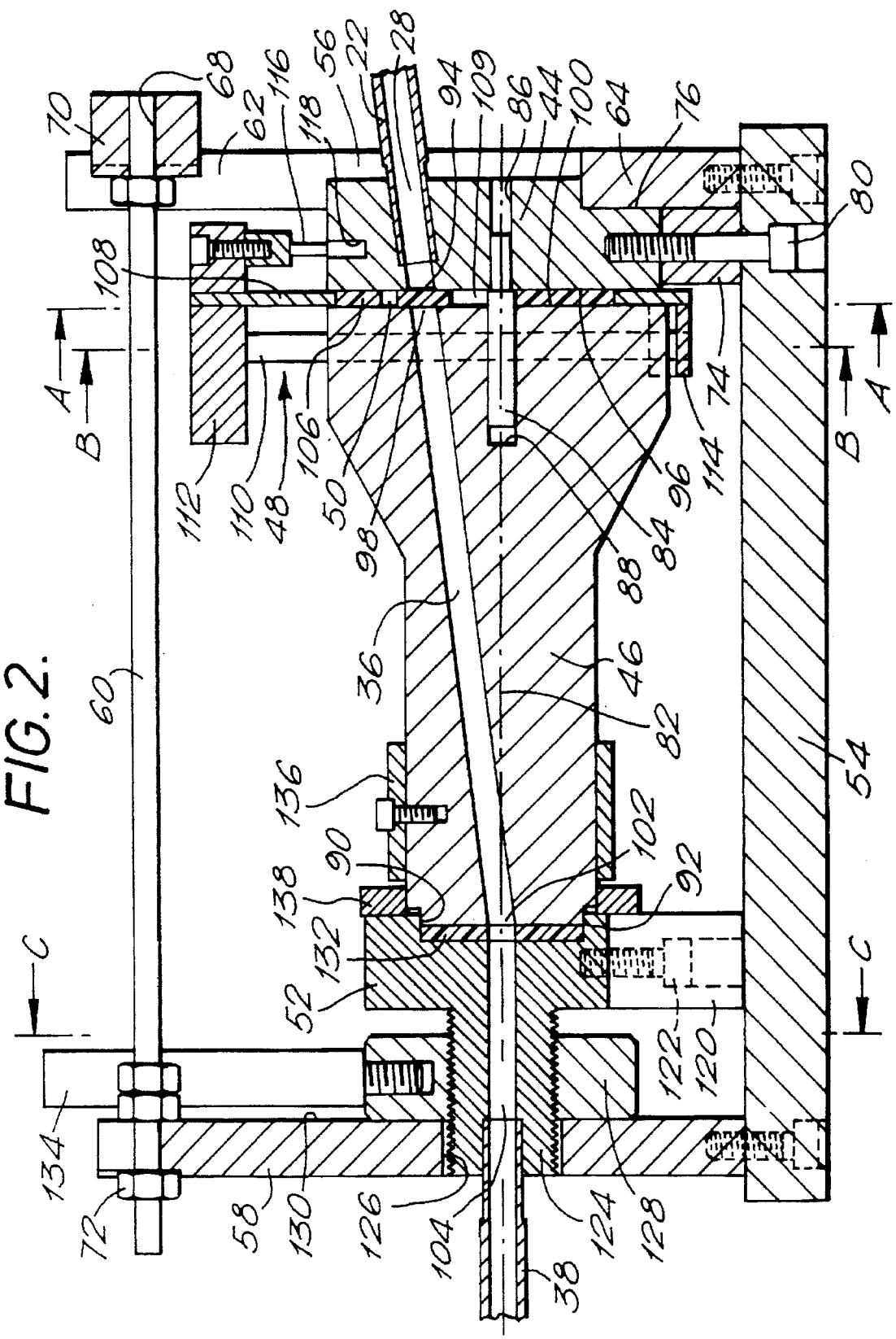
FIG. 2 is an axial cross-section of a valve device of the apparatus of FIG. 1.

Referring first to FIG. 1, the illustrated apparatus comprises a plurality of reservoirs, shown as 3 and referenced 10, 12 and 14 respectively. Each reservoir contains a supply of a different coloured resin 16, 18 and 20. Conduits 22, 24 and 26 interconnect the reservoirs 10, 12, 14 with respective inlet passages 28, 30 and 32 of a valve device 34. The valve device has a single outlet passage 36 which is connected via an outlet conduit 38 to an applicator 40 for applying a resin coating to an optical fibre 42 which is being drawn from a preform (not shown).

The inlet passages 28, 30 and 32 are defined in a first body 44 of the valve device and the outlet passage 36 is defined in a second body 46 of the valve device. The valve device also comprises a flow control means 48 disposed between bodies 44 and 46. The flow control means has a first position relative to the body 46 for blocking all of the inlet passages 28, 30, 32 and also the outlet passage 36 and a second position relative to the second body for allowing flow to the outlet passage 36 from an inlet passage aligned therewith. As schematically illustrated, the flow control means is in its second position allowing flow to the outlet passage 36 from the aligned inlet passage 28 through a through-aperture 50.

The reservoirs 10, 12, 14 are pressurised in order to direct flow towards the valve device. Thus, in the illustrated condition of the valve device, resin 16 from reservoir 10 is being directed through conduit 22, inlet passage 28, through-aperture 50, outlet passage 36 and outlet conduit 38 to the applicator 40. Resins 18 and 20 from the other two reservoirs 12 and 14 are being directed through conduits 24 and 26 to inlet passages 30 and 32, but flow from the inlet passages 30 and 32 is blocked by the flow control means 48.

When it is desired to coat the optical fibre with resin 18 or 20 instead of resin 16, the flow control means is put into the above-mentioned first position in which all of the inlet passages 28, 30 and 32 are blocked, whereupon the bodies 44 and 46 are relatively moved to put inlet passage 30 or inlet passage 32 into alignment with outlet passage 36 and thereafter the control means is put into its second position for allowing flow from inlet passage 30 or 32 to outlet passage 36 through through-aperture 50. In the first position of the flow control means the outlet passage 36 is also blocked thereby in order to prevent backflow of resin from the outlet passage 36.

In the illustrated apparatus, the second body 46 is rotated relative to the first body 44 to put the outlet passage in alignment with a selected inlet passage. In this case, the flow control means is arranged to rotate with the valve body 46 and is moveable between the above-mentioned first and second positions by a sliding movement transverse the axis about which it and the body 46 rotates.

A preferred embodiment of the valve device 34, which is only schematically illustrated in FIG. 1, will now be described with reference to FIGS. 2 to 6. In these figures the parts of the valve device described above are given like reference numerals where appropriate. Whilst the valve device 34 in FIG. 1 is illustrated as having only three inlet passages in the first body 44, the preferred embodiment is provided with seven such inlet passages (as best appreciated from FIGS. 5 and 6) and for the sake of clarity, each of these inlet passages has been referenced 28. It will be understood, of course, that any number of inlet passages may be provided.

The valve device of FIGS. 2–6 comprises the above-mentioned first and second bodies 44, 46, the control means 48 and a third body 52 assembled together and mounted on a mount comprising a base 54, a first end wall 56 mounted to the base 54 at one end thereof and upstanding from the base, a second end wall 58 mounted to the other end of the base 54 and upstanding therefrom and a tie rod 60 interconnecting the end walls 56 and 58 at portions thereof remote from the base 54.

Figure 4:
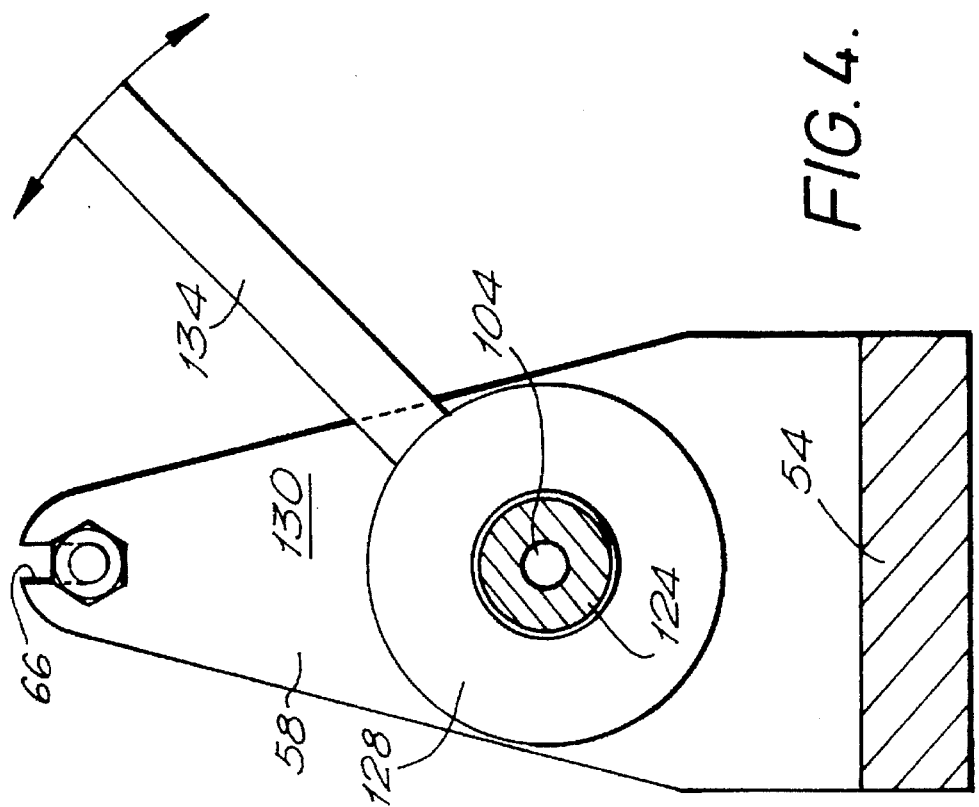
FIG. 4 is a view taken along the line C—C in FIG. 2.
Figure 3:
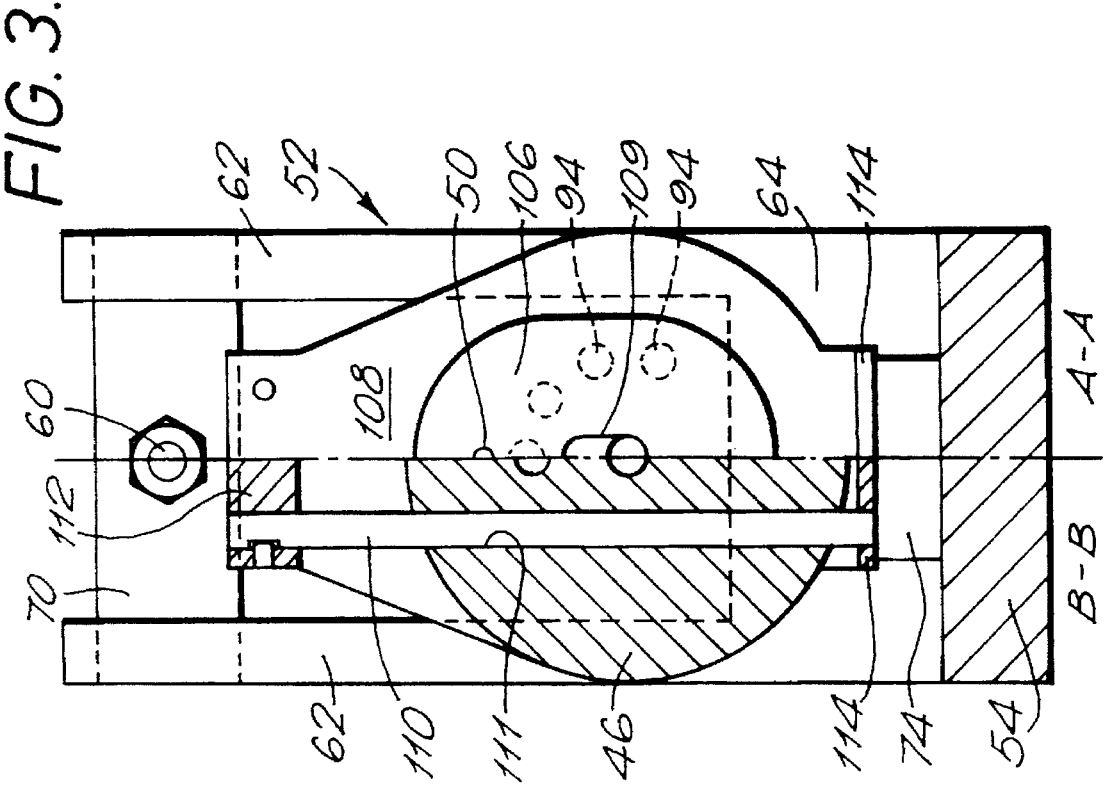
FIG. 3 shows half sectional views taken along the lines A—A and B—B in FIG. 2 in its right and left hand sides respectively.
Figure 5:
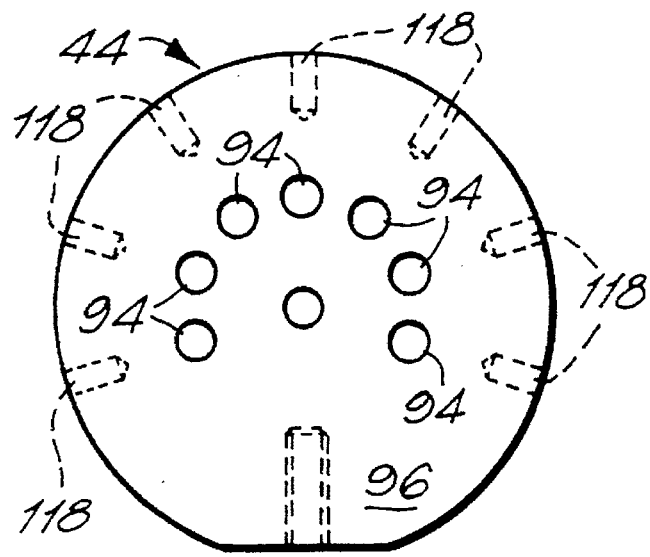
FIGS. 5 and 6 are views of the two end faces of a first body of the valve device.

The end wall 56 is bifurcated, with two arms 62 extending from a base portion 64 as best shown in FIG. 3. The end wall 58 is generally triangular in shape as shown in FIG. 4. The tie rod 60 extends through a slot 66 in the end wall 58 and a bore 68 in a crosspiece 70 extending between the arms 62 of the end wall 56. The tie rod is threadedly engaged with the bore 68 and is tensioned by means of a nut 72 which threadedly engages the opposite end of the tie rod.

Figure 6:
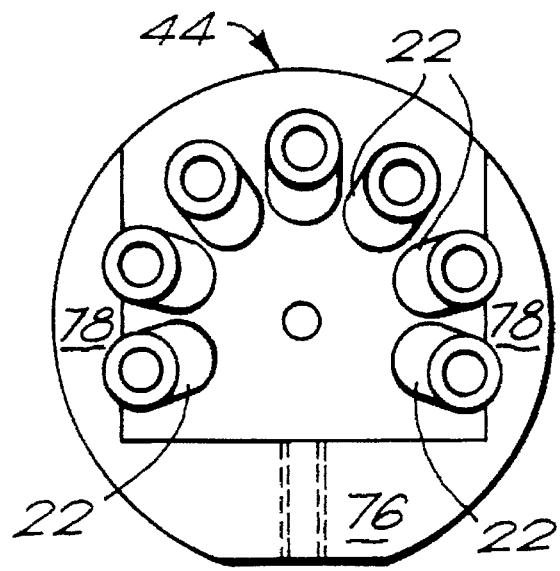

The first body 44 of the valve device is mounted adjacent the end wall 56 and in overlapping relationship therewith on a support foot 74 on the base 54. The body 44 which is otherwise generally cylindrical is provided with stepped recesses in order to allow its overlapping relationship with end wall 56. As best shown in FIG. 6, these recesses define a flat side surface 76 for engagement with the axially inwardly facing side surface of the base portion 64 of the wall 56 and respective flat side surfaces 78 for engaging the axially inwardly facing side surfaces of the arms 62 of the wall 56. The body 44 is secured against rotation relative to the mount by bolt 80 which passes through support foot 74 and is threadedly engaged with the body 44 and additionally by virtue of its overlapping relationship with the end wall 56.

The second body 46 is mounted for rotation relative to the first body 44 about an axis 82. To this end a pivot 84 on the axis extends into respective bores 86 and 88 of the two bodies. Rotational support at the end of the second body 46 remote from the first body 44 is achieved using the third body 52 which is provided with an annular, radially inwardly facing bearing surface 90 which cooperates with a radially outwardly facing annular bearing surface 92 provided on the second body 46.

The inlet passages 28 are circumferentially spaced apart about the axis 82 and ports 94 thereof also circumferentially spaced apart about axis 82 are disposed in a planar face 96 of the first body 44 adjacent the control means 48. The outlet passage 36 in the second body 46 has a port 98 in a planar surface 100 adjacent the control means 48 and positioned such that the port 98 is alignable with any selected one of the ports 94 on rotation of the body 46 about the axis 82 relative to the body 44.

The outlet passage 36 extends within the second body from the port 98 to a further port 102 on the axis 82 at the end of the second body 46 supported by the third body 52. The third body has a through-passage 104 on the axis 82 which is therefore always in flow communication with the port 102.

The flow control means 48 comprises a seal element formed as a plate 106 held within a holder 108. The seal plate 106 which advantageously may be formed from a PTFE material is disposed between the body 44 and the body 46 and is provided with a slot 109 through which the pivot 84 extends to allow sliding movement of the seal plate transverse the axis 82. Such sliding movement is controlled by two slide bars 110 (one only shown in the figures) which extend through through-bores 111 through the second body 46, one on each side of the axis 82, between an operating handle 112 and a stop member 114, each of which is secured to the holder 108. The flow control means and the second body 46 rotate together about axis 82 by virtue of the slide bars 110 of the former extending through the through-bores 111 of the latter.

The through-aperture 50 of the control means is provided in the seal plate 106 in radial alignment with the slot 109. In the figures, the flow control means is illustrated in the above-mentioned first position—the seal plate 106 blocking all of the inlet passages and the outlet passage. It will be appreciated that by sliding the flow control means downwardly (as viewed in the figures) the through-aperture 50 will be moved into alignment with the port 94 of the inlet passage 28 shown in FIG. 2 and the port 98 of the outlet passage 36 allowing flow between those passages. It will also be understood that in this position the seal plate blocks flow from the ports 94 of the other inlet passages. The holder 108 also carries a location pin 116, which locates within one of a plurality of radial bores 118 in the first body 44 when the port 94 of an inlet passage associated with that bore is aligned with the port 98.

The third body 52 is supported on the base 54 by a support foot 120 which is secured to the third body by a bolt 122 but is free to slide on the base 54. The third body is provided with a threaded portion 124 which extends through a bore 126 in the end wall 58. A nut 128 is threadedly engaged with the threaded portion 124 and located axially inward of the end wall 58. Movement of the nut in the axially outward direction causes it to engage the axially inward facing surface 130 of the end wall 58 whereupon further movement in that direction urges the third body 52 towards the second body to compress a seal plate 132 therebetween and to cause the second body 46 to be urged towards the first body 44, thus urging the respective faces 96 and 100 of the first and second bodies into engagement with the seal plate 106. To assist fine rotation of the nut 128, it is provided with a radially outwardly extending lever arm 134.

It will be appreciated that the nut 128 is screwed into engagement with the surface 130 of the end wall to urge the third and second bodies into sealing engagement with the seal 132 and the second and first bodies into sealing engagement with the seal plate 106 when the latter is in its second position allowing flow to the outlet passage 36 from a selected one of the inlet passages 28 which has been aligned therewith.

In order to align the outlet passage 36 with a different inlet passage 28, for example when it is desired to change the colour of the resin being applied to an optical fibre, the nut is slackened off sufficiently to enable the flow control means 48 to be slid to its first position (as illustrated in the figures) and to allow rotation of the second body 46 together with the control means 48 about the axis 82 to bring the new inlet passage 28 into alignment with the outlet passage. During this sliding and rotating movement of the control means, the seal plate is still effective to block flow from the inlet passages, each of which contains resin under pressure from the respective reservoirs, and also to prevent backflow of resin from the outlet passage 36. To assist this alignment operation, a collar 136 is mounted for rotation with the second body 46 and is provided with circumferentially spaced apart marks which align with a mark on a ring 138 secured to the third body adjacent thereto when the inlet passages are aligned with the outlet passage. When such an alignment occurs, the control means is slid to its second position, the pin 116 being received in the bore 118 associated with the selected index passage. Thereafter the nut is re-tightened to increase the effectiveness of the seals between the third and second and the second and first bodies.

The illustrated valve device enables a colour change for the resin being applied to an optical fibre to be achieved relatively quickly. The valve is self-flushing with the old colour resin being removed by the new colour resin. The speed at which a change of colour may be achieved can be increased by providing the applicator with a bleed valve 140 as illustrated in FIG. 1. As will be appreciated, the bleed valve would be opened until the colour of the resin reaching the applicator was as required. In this connection it will also be appreciated that in the illustrated valve device there is no dead-space in which the old colour might remain thereby contaminating the new colour.

It will also be understood that as the reservoirs remain pressurised at all times and the ports 94 and 98 are blocked during a changeover, the risk of air being introduced into the resin being applied is minimised.

It will also be understood that there is no need to disturb the set-up of the applicator during a colour change.

We claim:

1. A valve device comprising a first body defining a plurality of inlet passages each of which is connectable to a respective inlet conduit; a second body defining an outlet passage connectable to an outlet conduit; and a flow control means disposed between said first and second bodies, said bodies being moveable relative to each other for putting any selected one of said inlet passages in alignment with said outlet passage for the flow of fluid from said inlet passage to said outlet passages, and said flow control means being movable between a first position relative to said second body for blocking all of said inlet passages and said outlet passage preventing fluid flow therebetween and a second position relative to said second body for allowing fluid flow to said outlet passage from an inlet passage aligned therewith.

2. A valve device as claimed in claim 1, wherein said bodies are relatively rotatable about an axis for putting any selected one of said inlet passages in alignment with said outlet passage, said inlet passages having ports adjacent said control means which are circumferentially spaced apart about said axis, said outlet passage having a port adjacent said control means with which port said inlet passage ports are alignable on relative rotation of said bodies.

3. A valve device as claimed in claim 2, wherein said control means comprises a planar seal element disposed between respective faces of said bodies in which said ports are disposed for sealing engagement with said faces, said seal element having a through-aperture which is aligned with said outlet passage port in said second position of said flow control means and which is radially spaced from said outlet passage port in said first position of said flow control means.

4. A valve device as claimed in claim 3, including selectively operable means coupled to said bodies for urging said faces into engagement with said seal element.

5. A valve device as claimed in claim 4, wherein said second body is rotatable about said axis.

6. A valve device as claimed in claim 5, wherein said outlet passage extends within said second body from said port thereof adjacent said control means to a further port on said axis.

7. A valve device as claimed in claim 6, wherein said second body is supported for rotation about said axis adjacent said further port by a third body having a through passage aligned with said further port.

8. A valve device as claimed in claim 7, wherein said selectively operable means for urging said faces into engagement with said seal element comprises means for causing said third body to apply an axial force to said second body in a direction towards said first body.

9. Coating apparatus comprising:
  a plurality of reservoirs for containing supplies of different resins, an applicator for applying a resin coating to an elongate member, a valve device comprising a first body defining a plurality of inlet passages each of which is connectable to an outlet conduit; and a flow control means disposed between said first and second bodies, said bodies being moveable relative to each other for putting any selected one of said inlet passages in alignment with said outlet passage, and said flow control means having a first position relative to said second body for blocking all of said inlet passages and said outlet passage and a second position relative to said second body for allowing flow to said outlet passage from an inlet passage aligned therewith, respective inlet conduits interconnecting said reservoirs with respective inlet passages of said valve device and an outlet conduit via which said outlet passage of said valve device is connected to said applicator.

10. The apparatus of claim 9, wherein said bodies are relatively rotatable about an axis for putting any selected one of said inlet passages in alignment with said outlet passage, said inlet passages having ports adjacent said control means which are circumferentially spaced apart about said axis, said outlet passage having a port adjacent said control means with which port said inlet passage ports are alignable on relative rotation of said bodies.

11. The apparatus of claim 10, wherein said control means comprises a planar seal element disposed between respective faces of said bodies in which said ports are disposed for sealing engagement with said faces, said seal element having a through-aperture which is aligned with said outlet passage port in said second position of said flow control means and which is radially spaced from said outlet passage port in said first position of said flow control means.

12. The apparatus of claim 11, including selectively operable means coupled to said bodies for urging said faces into engagement with said seal element.

13. The apparatus of claim 12, wherein said second body is rotatable about said axis.

14. The apparatus of claim 13, wherein said outlet passage extends within said second body from said port thereof adjacent said control means to a further port on said axis.

15. The apparatus of claim 14, wherein said second body is supported for rotation about said axis adjacent said further port by a third body having a through passage aligned with said further port.

16. The apparatus of claim 15, wherein said selectively operable means for urging said faces into engagement with said seal element comprises means for causing said third body to apply an axial force to said second body in a direction towards said first body.

* * * * *